United States Patent [19]
Agraharam et al.

[11] Patent Number: 5,987,508
[45] Date of Patent: Nov. 16, 1999

[54] METHOD OF PROVIDING SEAMLESS CROSS-SERVICE CONNECTIVITY IN TELECOMMUNICATIONS NETWORK

[75] Inventors: Sanjay Agraharam, Marlboro; Prasad Balagopalan, Matawan; Marian Rogers Croak, Fair Haven; Tom Evslin, Princeton; Stephen M. Gurey, Livingston; Ping Benjamin Hu, Summit; Ram S. Ramamurthy, Manalapan; Richard T. Roca, Basking Ridge; David Hilton Shur, Middletown; Sandeep Sibal, Matawan; Peter H. Stuntebeck, Little Silver; Roy Philip Weber, Bridgewater; Aleksandr Zelezniak, Matawan, all of N.J.

[73] Assignee: AT&T Corp, New York, N.Y.

[21] Appl. No.: 08/910,307

[22] Filed: Aug. 13, 1997

[51] Int. Cl.$^6$ ..................................................... G06F 13/00
[52] U.S. Cl. ........................................ 709/217; 379/93.24
[58] Field of Search .................................... 358/402, 440; 379/114, 88.13, 93.23, 93.24, 100.14, 112, 130, 201, 355, 90.01; 709/200, 201, 203, 217, 218, 219

[56] References Cited

U.S. PATENT DOCUMENTS

| | | | |
|---|---|---|---|
| 5,115,326 | 5/1992 | Burgess et al. | 358/440 |
| 5,339,156 | 8/1994 | Ishic | 379/100.08 |
| 5,590,178 | 12/1996 | Murakami et al. | 379/93.18 |
| 5,757,891 | 5/1998 | Wang | 379/93.24 |
| 5,859,967 | 1/1999 | Kanfeld et al. | 395/188.01 |
| 5,862,202 | 1/1999 | Bashoura et al. | 379/100.14 |

*Primary Examiner*—Moustafa M. Meky

[57] ABSTRACT

Cross-service connectivity between use of the telephone network and use of an e-mail data network is provided by enabling a recipient of an e-mail message to receive e-mail messages through an alias e-mail address which is directly associated with the recipient's telephone number. Thus, the alias e-mail address consists of the recipient's telephone number as the recipient name at a well-known and publicized common domain name server. A sender therefore addresses an e-mail message to the recipient to that alias e-mail address using the recipient's alias telephone number name. A message addressed to the alias e-mail address is sent to a translation server at that known domain name, where the alias telephone number-recipient name is translated to the actual e-mail address comprising the recipient's actual name and associated domain name server, and the message is then forwarded to that recipient at that actual e-mail address. Such aliasing capabilities are effected through a registration process in which the recipient registers for such a service and provides to the translation server his or her actual e-mail address and associated telephone number to which senders of messages to that recipient can use to address e-mail messages.

32 Claims, 4 Drawing Sheets

METHOD OF PROVIDING SEAMLESS CROSS-SERVICE CONNECTIVITY IN TELECOMMUNICATIONS NETWORK

TECHNICAL FIELD

This invention relates to transmitting e-mail messages, and more particularly, to a method of improving the facility for sending an e-mail message to an intended recipient.

BACKGROUND OF THE INVENTION

More and more people in both the business world and non-business world are moving into the electronic age of communication in which e-mail messaging between senders and recipients is becoming the accepted and normal mode of information transfer. The difficulty with e-mail messaging is that the sender must know the actual e-mail address of the recipient in order to transmit a message. Such an address commonly consists of a name, or handle associated with the recipient and a domain name associated with the particular e-mail server with which the recipient is a subscriber and has an established e-mail account. Such an e-mail address will typically take the form of recipient_name@domain_name. Generally, the recipient name chosen by the user can be a first or last name, a combination of both, initials, or a fanciful combination of letters and numerals that in some way uniquely identifies the particular user on the particular e-mail server on which that user has established an e-mail account. As people become overloaded with needing to keep track of their own multiple Personal Identification Numbers (PINs), etc., and the phone numbers of all the parties with whom they communicate, the need to also remember and/or keep track of the e-mail addresses of the multiple recipients that a sender may be in communication with can add another layer of complexity in what is generally an otherwise easy method of communication.

SUMMARY OF THE INVENTION

In accordance with the present invention, cross-service connectivity between use of the telephone network and use of an e-mail data network is provided by enabling a recipient of an e-mail message to receive e-mail messages through an alias e-mail address which is directly associated with the recipient's telephone number. Thus, the alias e-mail address consists of the recipient's telephone number as the recipient name at a well-known and publicized common domain name server. A sender can therefore address an e-mail message to the recipient to that alias e-mail address using the recipient's alias telephone number name, which more than likely he or she either knows or can readily determine through normal directory assistance methods. In accordance with the invention, a message addressed to the alias e-mail address is sent to a translation server at that known domain name, where the alias telephone number-recipient name is translated to the actual e-mail address comprising the recipient's actual recipient name and associated domain_name server and the message is then forwarded to that recipient at that actual e-mail address.

In order to effect such aliasing capabilities, the recipient registers for such a service and provides to the translation server his or her actual e-mail address and associated telephone number to which senders of messages to that recipient will use to address e-mail messages. Further, in accordance with the invention, if an e-mail message is sent to a telephone-alias e-mail address for a recipient who has not registered for such service, then a telephone call is initiated to the intended recipient's telephone number indicated in the alias recipient name to inform that recipient that an e-mail message intended for him or her has been received. The intended recipient is then requested to register for the service. If the intended recipient does not register, and thus does not receive the message intended for him or her, a return e-mail message is generated and sent to the sender to inform him or her of that delivery of the message to the intended recipient was unsuccessful since the intended recipient is not registered to receive e-mail via the telephone-alias address.

The telephone-alias address can be used in combination with other identifiers in the recipient name to separate mail to different members of a household using the same telephone number. Furthermore, the domain name may contain a geographical identifier. For example, such a geographical identifier may be indicative of a recipient's country so that the sender need not include the recipient's country code as part of the telephone number recipient name for a message directed outside the United States.

DETAILED DESCRIPTION

Figure 1:
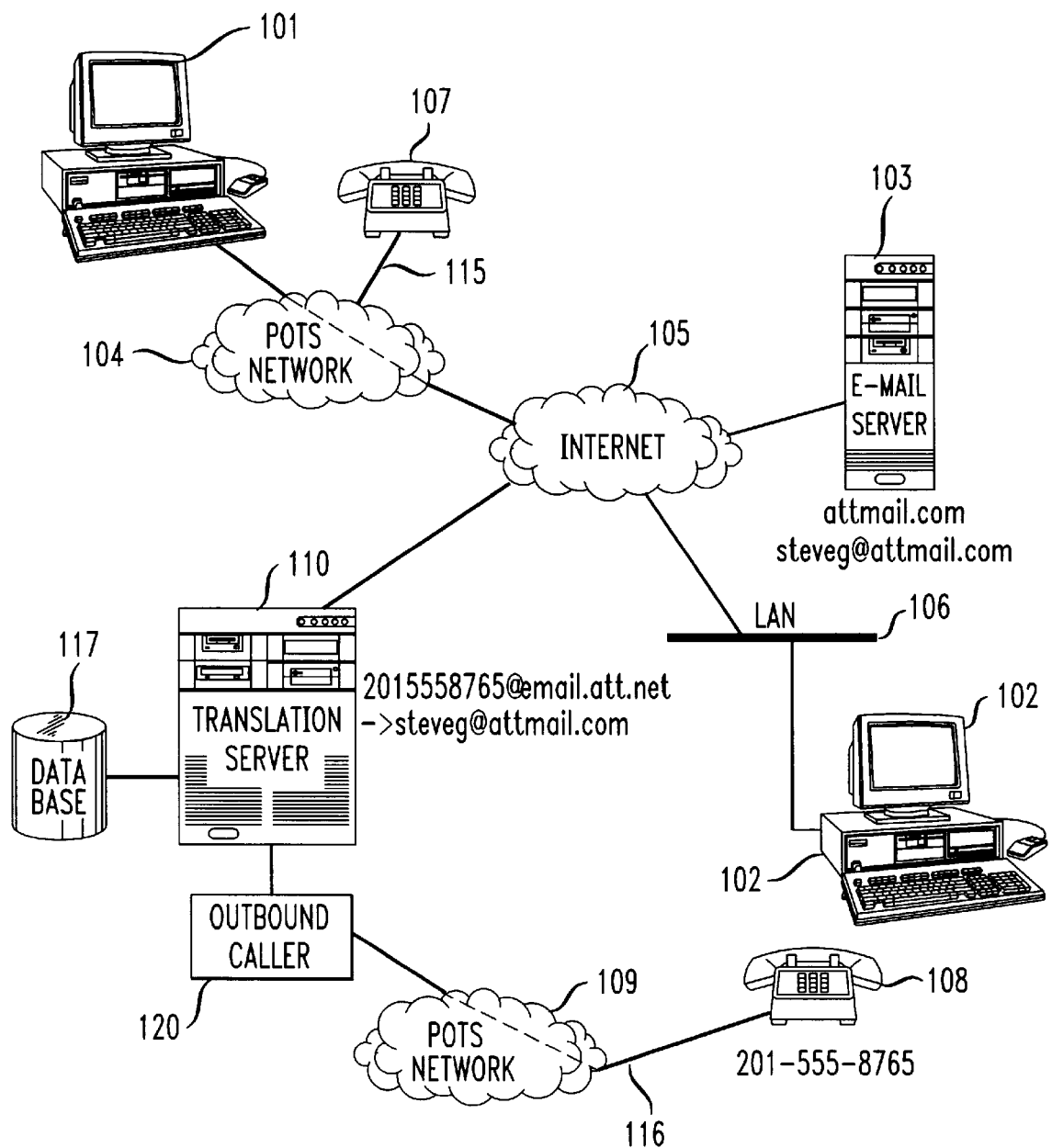
FIG. 1 is a block diagram showing the architecture of the e-mail translation system of the present invention.

With reference to FIG. 1, a user at a client terminal 101 who wishes to send an e-mail message to a recipient at client terminal 102 must know both the e-mail name by which the recipient is known and the domain name of the e-mail server 103 through which the intended recipient has an e-mail account. In FIG. 1, client terminal 101 is connected through the POTS network 104 via a modem (not shown) to an Internet Service Provider (ISP) (not shown), which provides a point of presence to the Internet 105. Client terminal 101 may alternatively be connected to the Internet via other means including, for example, a cable modem, an ISDN telephone line, a private data line, etc., that may, depending on the arrangement, bypass the POTS network 104 altogether. For purposes of illustration, the intended recipient's client terminal 102 is shown connected to a Local Area Network (LAN) 106, which is connected directly to the Internet 105 by a T1 line or other data facility. The sender at client terminal 101 is also shown to be associated with a telephone station set 107, which is illustratively shown as being connected over a separate telephone line 115 to the POTS network 104. Such telephone station set 107 may, however, share a communication link to the POTS network 104 with client terminal 101. Similarly, a telephone station set 108 associated with the recipient at client terminal 102 is shown connected on a separate telephone line 116 to POTS network 109, which may be the same POTS network as network 104.

As previously noted, in the prior art, in order for the user at client terminal 101 to send an e-mail message to an intended recipient at client terminal 102, the sender must know recipient's actual complete e-mail address including the precise domain name of e-mail server 103 and the precise name by which that server knows the recipient. Once a sender sends an e-mail message to that address, the intended recipient at client terminal 102, when logging on and accessing e-mail server 103, is able to read any e-mail messages that might have been addressed to him or her at that e-mail address.

The present invention eliminates the need for a sender of an e-mail message to know the actual e-mail address of an intended recipient and allows a sender of an e-mail message to direct the message to a recipient's alias address that contains as the recipient's name, a string of digits representing the recipient's telephone number. It is presumed that such telephone number is more likely to be known by the sender, or if not known, obtainable through conventional directory assistance methods. When such telephone number alias name is combined with a domain name that is well known and advertised to a large population of users to form an alias telephone number e-mail address, a sender of an e-mail message can easily send a message to the intended recipient.

Address translation between a recipients alias telephone number e-mail address and that recipient's actual e-mail address is effected, in accordance with the invention, through a translation server 110 connected to the Internet 105. This translation server 110 has as its domain address an address that once advertised and promulgated by the provider of the service throughout the e-mail using community, would be readily remembered by all e-mail senders who would be desirous of addressing e-mail to recipients using the telephone number aliasing method. As an example, the domain address of translation server could be email.att.net. In order for a recipient to receive e-mail messages through such an alias domain name, a recipient who would like to be able to receive messages addressed by senders using the telephone alias must register him or herself with translation server 110. In this registration process the recipient must provide his or her actual e-mail address and his or her associated telephone number. Thus, for example, the recipient using client terminal 102 whose real e-mail address is steveg@aftmail.com and whose telephone number is "201-5558765" would register that information with translation server 110, where it would be stored in associated database 117. That recipient's telephone number alias e-mail address would be 2015558765@email.aft.net. All senders who know that recipient's telephone number or can obtain it using directory assistance would then be able to address their e-mail using that address.

Once the recipient has registered with translation server 110, an e-mail message addressed to the alias address of that recipient is directed to translation server 110. For example, an e-mail message from a sender at client terminal 101 addressed to 2015558765@email.att.net is forwarded to translation server 110. Translation server 110, running a standard and well known Sendmail Daemon program, uses the telephone number address identity, 2015558765, to access database 117. Using that telephone number alias name, server 110 retrieves from database 117 the actual e-mail address associated with that telephone number and the Sendmail Daemon forwards the received e-mail message to that recipient's actual e-mail address. Thus, in the example, the e-mail message addressed to 2015558765@email.att.net is forwarded by server 110 to its corresponding actual e-mail address of steveg@attmail.com. As shown in FIG. 1, database 117 is cooperatively co-located with translation server 110. Database 117 could, however, be located elsewhere on Internet 105. With such an arrangement, when translation server 110 receives an e-mail message, it sends a message containing the received telephone number identity to the non-co-located database using, for example, the well known Lightweight Directory Access Protocol (LDAP), to retrieve from that database the necessary associated real e-mail address. The retrieved real e-mail address information is then transmitted back to translation server 110 using LDAP, where the Sendmail Daemon running on server 110 forwards the message to the identified actual e-mail address.

If a user sends an e-mail message using the telephone alias addressing method to a recipient who has not yet registered for the service, translation server 110 will not be able to forward that message to its intended recipient. Having received the telephone number of the recipient as part of the alias address, translation server 110 initiates an outbound computer-generated and interactive voice-call through associated outbound caller 120 over the POTS network 109 to the intended recipient's telephone number. During this interactive voice call, the user is automatically informed that an e-mail message has been received and that the waiting message can be retrieved by registering for the service. Instructions for registering are provided to enable the intended recipient to subscribe to the service. If the recipient cannot be initially reached, attempts to reach the recipient can be repeated for a predetermined period of time. If the recipient cannot be reached by telephone, or elects not to register for the service, the translation server 110 will send the e-mail message back to the sender indicating that the message was undelivered or undeliverable with an indication that the recipient was not registered and could not be reached or did not want to register for the service. Further, if the intended recipient indicates that he or she does not want to register for the service, a record is created and flagged in database 117 for that user's associated telephone number to indicate that future messages to that telephone number should not generate telephone calls to that recipient. If that recipient later does register for the service, the flag is removed.

Figure 2:
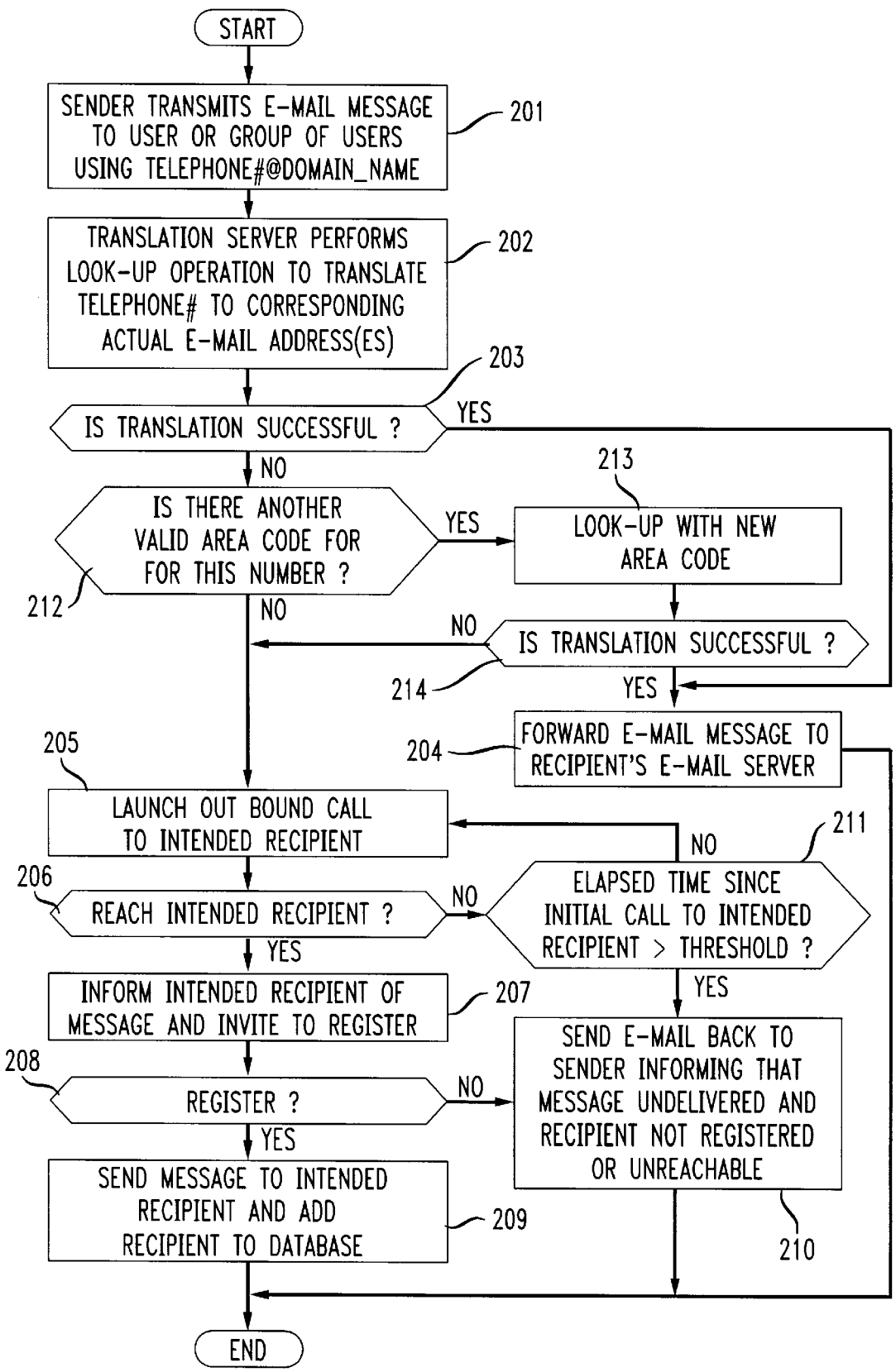
FIG. 2 is a flowchart showing the steps associated with the present invention for transmitting an e-mail message using the telephone number alias name of the recipient in accordance with the present invention.

The flowchart of FIG. 2 illustrates the steps of a user sending an e-mail message to a recipient using the telephone number aliasing procedure of the present invention. At step 201, the sender transmits an e-mail message to a user or group of users using each recipient's telephone#@domain_name. At step 202, the translation server performs a look-up operation to translate telephone# to the recipient's corresponding actual e-mail address. At decision step 203, a decision is made whether the translation was successful. If yes, at step 204 the e-mail message is forwarded to the recipient's e-mail server and the process ends. If the translation was not successful, at step 205 an outbound voice-call is placed to the intended recipient's indicated phone number. If, at decision step 206, the intended recipient is reached, at step 207 the intended recipient is informed of the e-mail message and invited to register. If, at step 208, the recipient decides to register, at step 209 the message is sent to that recipient and that recipient's telephone number/e-mail address is added to the database and the process ends. If, at step 208, the intended recipient does not register, at step 210 an e-mail message is sent back to the sender informing him or her that the message was undeliverable and that the intended recipient is not a registered user and a record for that telephone number is flagged in the database to preclude further attempts to reach that recipient. The process then ends. If, at decision step 206, the intended recipient is not reached, at step 211 the time elapsed since an initial call to the intended recipient at step 205 is compared with a predetermined time value threshold. If less than that time value threshold, an outbound call is again attempted to the intended recipient. If greater than that time value no further attempts are made and the message is returned to the sender per step 210.

With reference again to FIG. 1, translation server 110 having, as an example, a domain name of email.att.net can comprise a plurality of separate servers which each have an associated domain name that includes a modifier indicating a country associated with the intended recipient. Thus, the telephone number alias name would not need to include a country code of which the sender of the e-mail message might be not be aware. As an example, a domain name might be email.att.us.net for intended recipients in the United States, email.att.uk.net for intended recipients in the United Kingdom, email.att.cn.net for intended recipients in Canada, etc. This could be extended to using as a domain name a string of alphanumeric characters that includes a representation of some defined geographical area from which the recipient's telephone number alias name can be uniquely associated with the correct recipient.

It is not uncommon for parties that share the same home and thus telephone number to have multiple e-mail accounts. Thus, in order to properly direct an e-mail message addressed to the alias telephone number e-mail address, the telephone number alias name can be appended with an alphanumeric string that identifies a particular individual to whom the message is directed. Thus, for example, for a family which has four e-mail accounts and shares a common home telephone number of 201-555-8765, the telephone number alias names could be 2015558765.steve, 2015558765.fran, 2015558765.allison and 2015558765.Iowell, in order to direct the e-mall message to the correct recipient's e-mail address, or if they all share a common mailbox, the proper sub-mailbox.

Figure 3:
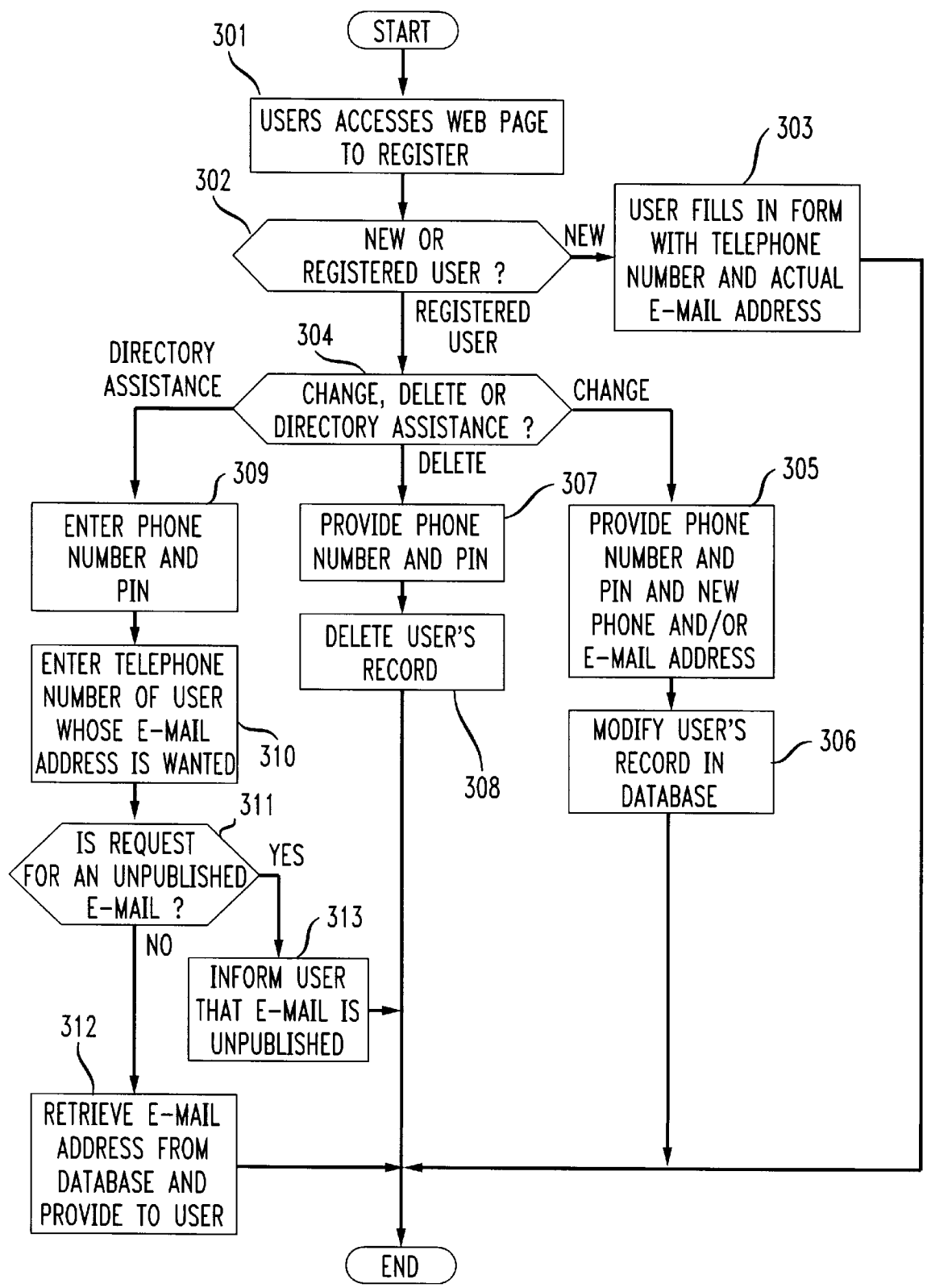
FIG. 3 is a flowchart showing the steps for a user to register and/or modify the service of the present invention, and to use the translation server in FIG. 1 as a directory for determining the e-mail address of an intended recipient.

In order for a user to be a recipient of e-mail messages forwarded to his or her actual e-mail address that were addressed to a telephone number alias e-mail address, the user must have registered him or herself with the translation server 110. With reference to the flowchart of FIG. 3, the steps of registering and for updating and changing one's registration are illustrated. The user registers by first accessing over the Internet, at step 301, a Web registration page provided by translation server 110 in response to the input of an associated URL address on the user's Web browser. At step 302, the Web page inquires whether the user is a new user or a registered user. If a new user, at step 303, the user fills in a provided form with the requested information including his or her telephone number and his or her actual e-mail address. In order to prevent the unauthorized redirection of e-mail, the user must also input a previously provided PIN. The translation server 110, after authenticating the user as being valid based on the provided PIN, can then thereafter forward all e-mail messages addressed to the alias telephone address to the indicated actual e-mail address. If the user later decides to change his or her alias telephone address, or decides to cancel the service, at step 302, he or she indicates that they are a registered user. At step 304 a determination is made whether the user wants to change or delete their alias, or, as will be described, wants to use the translation server to determine the actual e-mail address of another subscriber. If the user wants to modify his or her information, at step 305 the user provides his or her PIN and the new phone number and/or e-mail address. At step 306 the inputted information stored in database 117 is changed. If at step 304, the user wants to delete their alias address, at step 307 the user provides his or her PIN and phone number and indicates they want their alias address deleted. At step 308, the user's record in database 117 is deleted.

As noted above, a subscribing user can use translation server 110 as a directory to determine the actual e-mail address of another subscriber. Thus, at step 304, if the user has indicated that they want directory assistance, at step 309 they enter their own phone number and PIN. If validated, at step 310 they enter a telephone number of the subscriber whose actual e-mail address they want to determine. At step 311, the database is accessed to determine if the requested subscriber's actual e-mail address associated with that inputted telephone number is unpublished. If the address is unpublished, at step 313 the requesting user is informed that the requested e-mail address is unpublished. If the address is not unpublished and the inputted telephone number is associated with a subscriber, at step 312 the associated actual e-mail address of the requested subscriber is retrieved from database 117 and provided by translation server 110 to the requesting user.

In order to prevent fraud, the PIN provided to a user needs to be secure. Various methods of generating, providing, and verifying the PIN can be implemented. For example, a PIN could be generated as part of a customer's billing statement and sent to a user with a monthly phone bill offering the user the opportunity to register for the phone number e-mail aliasing service. When the user registers, the PIN can be verified using a database from the billing system from which the PIN was generated. Alternatively, the same algorithm used by the billing system to generate the PIN can be used by the translation server to verify it using hashing, or using a Public Key and a Private Key. Alternatively, no PIN is sent to the user. When the user registers with their telephone number and actual e-mail address, the system can accept the information and inform the user that a confirmation and a PIN will be sent to the user for verification before the service will be activated. The confirmation is sent to the registered actual e-mail address and the PIN is sent via snail-mail (U.S. Postal Service) to the users address that corresponds to the provided telephone number. The user is instructed to call an Interactive Voice Response System (IVR), typically an 800 call, from the same telephone number they registered with. The IVR system detects the phone number of the calling party from the Automatic Number Identification (ANI) and verifies that the telephone number and the PIN match, and then activates the alias mechanism. As a further alternative, the user receives the PIN as part of a billing insert, as noted above. When the user registers, a confirmation is sent to the user's account address with a confirmation number. The user must then register again and provide the confirmation number before the alias addressing mechanism is activated. In order to minimize changes to a recipients telephone number which each sender who uses the alias addressing mechanism must be made aware of, a number that follows a recipient for life, such as a 500 number, can be used as the telephone number alias name. Further, if a recipient's telephone number changes and that recipient effects that change within translation server 110 and database 117, database 117 can mark that previous telephone number name as being changed to the new telephone number name, and maintain the record associated with the previous phone number in an active state with a flag for less than or as long as the period during which a telephone company maintains that same telephone number as an inactive and unassigned telephone number. E-mail messages then directed to the original telephone number alias name will continue to be forwarded to the recipient's actual e-mail address for as long as that record in database 117 remains flagged. Further, an e-mail message will be sent to the sender informing the sender of the recipient's new telephone number and thereby the recipient's new telephone number alias name to which the sender should address future e-mail messages.

Figure 4:
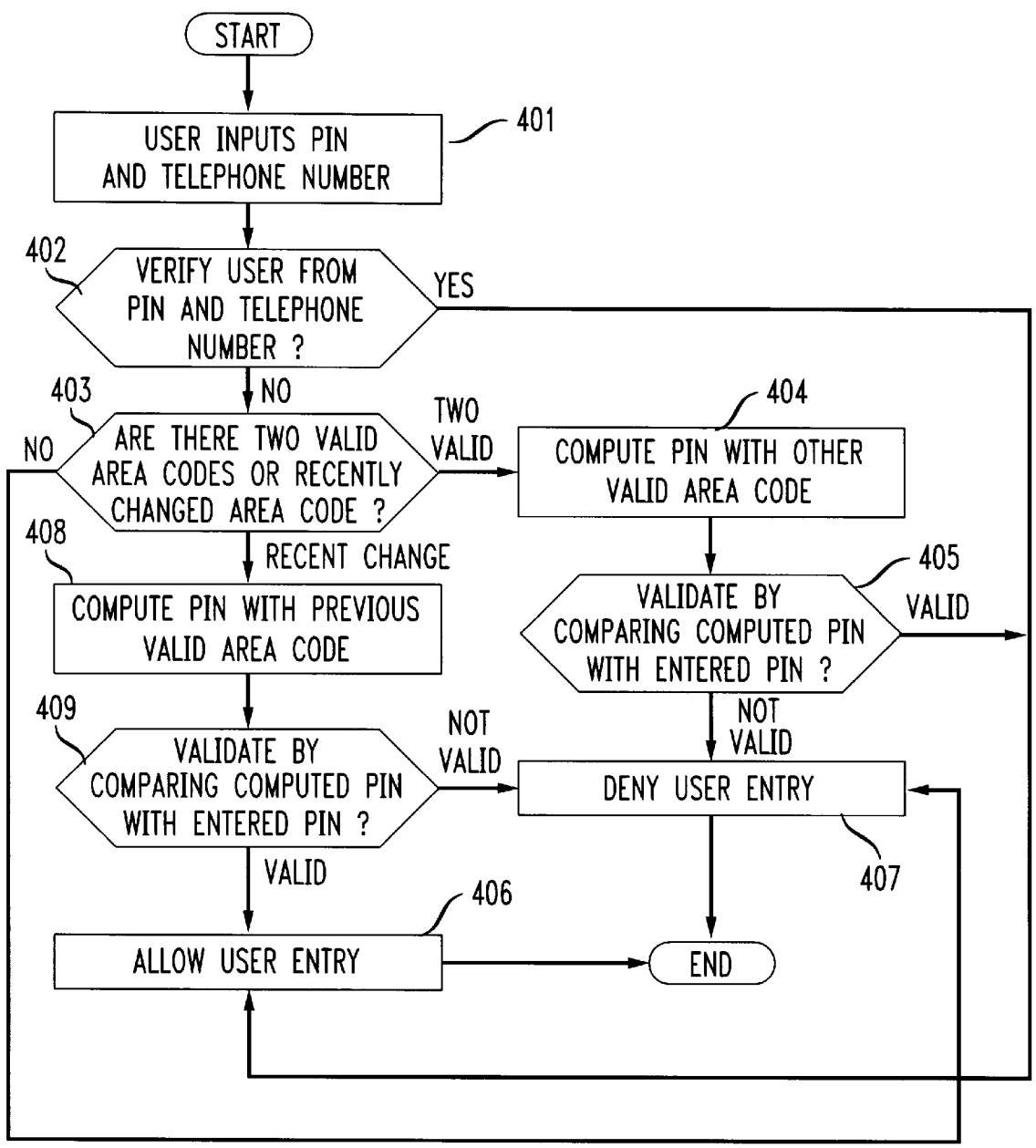
FIG. 4 is a flowchart showing the steps associated with the present invention when an intended recipient of an e-mail message may for some period of time be simultaneously associated with more than one area code.

Often there are periods of time in which a user may have two valid area codes. For example, when a new area code is introduced to a area, both the original area code and the new area code remain valid for all users in the entire area for several months until each area code is made exclusive in its respective geographic area. Thus, as described above, a message directed to a recipient's telephone number alias incorporating the old area code or incorporating the new area code will be forwarded to the recipient's actual e-mail address. When a user, however, needs to access the system using his or her PIN to register, change or delete their service, as described in conjunction with FIG. 3 above, a PIN that is created based on the user's telephone number may be invalid if the area code has changed and/or there is more than one valid area code currently attributable to the user's telephone number. The flowchart of FIG. 4 illustrates the steps of logging in to the system for purposes of registration or inputting changes for that portion of the process concerned with verifying the PIN provided by the user where such PIN has been derived from the telephone number of the user including that user's area code. At step 401, the user inputs his or her PIN and telephone number. At step 402 a determination is made as to the validity of the entered PIN from the PIN and the telephone number. If the PIN passes, the verification is completed and the user is allowed entry at step 406. If the PIN fails, it might be an invalid PIN based on the fact that both a new and old area code are both valid area with the telephone number and the PIN used by the user was created with the old area code. Alternatively, only a new area code is valid and the PIN inputted by the user was created based on the telephone number including the old area code. At step 403, a determination is made whether: 1) two valid area codes are then valid: 2) whether the area code has changed within a predetermined past period of time; or 3) whether neither of those events is true. If two area codes are valid, at step 404, the PIN is computed from the telephone number with the other valid area code. At step 405 that computed PIN is compared with the user entered PIN. If a match is made, the PIN is passed and the user is verified and allowed entry at step 406. If a match is not made, verification has failed and the user is denied entry at step 407. If, at step 403, there was a recent change in area codes, at step 408 a PIN is computed using the previous valid area code. At step 409, if that computed PIN matches the PIN inputted by the user, the PIN's validity is ascertained and the user is verified an allowed entry at step 406. If the computed PIN does not match the PIN inputted by the user, verification fails and the user is denied entry at step 407. If at step 403, if there are neither two valid area codes, nor a recent change in area code, then the user is denied entry at step 407.

The above-described embodiment is illustrative of the principles of the present invention. Other embodiments could be devised by those skilled in the art without departing from the spirit and scope of the present invention.

The invention claimed is:

1. A method of delivering an e-mail message to an actual e-mail address associated with a recipient comprising the steps of:

receiving an e-mail message intended for the recipient that is addressed by a sender to the recipient using an alias e-mail address of the recipient at a predetermined domain name server, the alias e-mail address including at least in part a telephone number associated with the recipient;

translating the alias e-mail address of the recipient at the predetermined domain name server into the actual e-mail address associated with the recipient; and forwarding the e-mail message to the actual e-mail address associated with the recipient.

2. The method of claim 1 wherein the alias e-mail address further includes an identification of the recipient out of a plurality of different recipients each of which is associated with the same telephone number.

3. The method of claim 1 wherein the telephone number associated with the recipient is a telephone number permanently associated with the recipient.

4. The method of claim 1 further comprising the step of:

after receiving the e-mail message, if the telephone number included within the alias e-mail address is associated with an intended recipient whose actual e-mail address cannot be translated from the name, initiating a call to the intended recipient at the telephone number included within the alias e-mail address to which the message is addressed to provide the intended recipient with the information that an e-mail message has been received.

5. The method of claim 4 wherein the call to the intended recipient further includes a request that the intended recipient provide his or her actual e-mail address so that the e-mail message can be forwarded to that actual e-mail address.

6. The method of claim 5 further comprising the step of:

if the e-mail message is not delivered to the intended recipient, sending an e-mail message to the sender informing the sender indicating that the message was undelivered.

7. The method of claim 5 further comprising:

if the recipient does not provide his or her actual e-mail address, inhibiting the initiation of a telephone call to the same intended recipient in response to a subsequent e-mail message addressed to the alias e-mail address.

8. The method of claim 1 wherein the domain name server to which the e-mail message is addressed includes a geographic identifier associated with the geographic location of the recipient.

9. The method of claim 8 wherein the geographic identifier is associated with a country.

10. The method of claim 1 wherein the received e-mail message is addressed to an alias e-mail address that includes at least in part a former telephone number that was previously associated with the recipient, the recipient being then associated with a new alias e-mail address that includes at least in part a new telephone number, the method further comprising the steps of:

translating the alias e-mail address that includes at least in part the former telephone number to an actual e-mail address associated with the new alias e-mail address that includes at least in part the new telephone number; and forwarding the e-mail message to the actual e-mail address associated with the new alias e-mail address.

11. The method of claim 10 wherein the steps of translating the alias e-mail address to an actual e-mail address associated with the new alias e-mail address and forwarding the e-mail message to the actual e-mail address associated with the new alias e-mail address are performed if the former telephone number is not associated by a telephone company with a user other than the recipient.

12. The method of claim 10 further comprising the step of forwarding an e-mail message to the sender that indicates the new alias e-mail address of the recipient.

13. The method of claim 1 further comprising the steps of:

after receiving the e-mail message, if the telephone number included within the alias e-mail address is associated with an intended recipient whose actual e-mail address cannot be translated from the alias e-mail address, determining whether there is another area code valid for the telephone number other than an area code included in the alias e-mail address;

if there is another valid area code, modifying the alias e-mail address of the recipient by using the other area code in place of the area code included in the alias e-mail address to which the e-mail message is addressed and using the modified alias e-mail address to translate into the actual e-mail address associated with the recipient.

14. The method of claim 13 further comprising the step of:

if the modified alias e-mail address cannot be translated to an actual e-mail address, initiating a call to the intended recipient at the telephone number included within the alias e-mail address to which the e-mail message was addressed or within the modified alias e-mail address to provide the intended recipient with the information that an e-mail message has been received.

15. A method of delivering an e-mail message to an actual e-mail address associated with a recipient comprising the steps of:

providing and storing an association between the actual e-mail address and a telephone number associated with the recipient;

receiving an e-mail message intended for the recipient that is addressed by a sender to the recipient using an alias e-mail address of the recipient at a predetermined domain name server, the alias e-mail address including at least in part the provided telephone number associated with the recipient;

translating the alias e-mail address of the recipient at the predetermined domain name server into the stored actual e-mail address associated with the recipient; and forwarding the e-mail message to the actual e-mail address associated with the recipient.

16. The method of claim 15 wherein the alias e-mail address further includes an identification of the recipient out of a plurality of different recipients each of which is associated with the same telephone number.

17. The method of claim 15 wherein the telephone number associated with the recipient is a telephone number permanently associated with the recipient.

18. The method of claim 15 further comprising the step of:

after receiving the e-mail message, if the telephone number included within the alias name to which the message is addressed is not associated with a recipient whose actual e-mail address can be determined, initiating a call to the intended recipient at the telephone number included within the alias e-mail address to which the message is addressed to provide the intended recipient with the information that an e-mail message has been received.

19. The method of claim 18 wherein the call to the intended recipient further includes a request that the intended recipient provide his or her actual e-mail address so that the e-mail message can be forwarded to that actual e-mail address.

20. The method of claim 19 further comprising the step of:

if the e-mail message is not delivered to the intended recipient, sending an e-mail message to the sender informing the sender indicating that the message was undelivered.

21. The method of claim 19 further comprising:

if the recipient does not provide his or her actual e-mail address, inhibiting initiation of a telephone call to the same intended recipient in response to a subsequent e-mail message addressed to the same alias e-mail address.

22. The method of claim 15 wherein the domain name server to which the e-mail message is addressed includes a geographic identifier associated with the geographic location of the recipient.

23. The method of claim 22 wherein the geographic identifier is associated with a country.

24. The method of claim 15 wherein the received e-mail message is addressed to an alias e-mail address that includes at least in part a former telephone number that was previously associated with the recipient, the recipient being then associated with a new alias e-mail address that includes at least in part a new telephone number, the method further comprising the steps of:

translating the alias e-mail address to which the e-mail message is addressed that includes at least in part the former telephone number to an actual e-mail address associated with the new alias e-mail address that includes at least in part the new telephone number; and forwarding the e-mail message to the actual e-mail address associated with the new alias e-mail address.

25. The method of claim 24 wherein the steps of translating the alias e-mail address to an actual e-mail address associated with the new alias e-mail address and forwarding the e-mail message to the actual e-mail address associated with the new alias e-mail address are performed if the former telephone number is not associated by a telephone company with a user other than the recipient.

26. The method of claim 24 further comprising the step of forwarding an e-mail message to the sender that indicates the new alias e-mail add of the recipient.

27. The method of claim 15 wherein the step of providing and storing comprises:

receiving a PIN from the recipient;

receiving the actual e-mail address of the recipient; and the telephone number associated with the recipient;

verifying the recipient from the PIN; and if the recipient is verified as being valid, storing the association between the telephone number and the actual e-mail address.

28. The method of claim 27 wherein the PIN is derived from the telephone number associated with the recipient.

29. The method of claim 28 wherein the step of verifying the recipient from the PIN comprises:

providing the PIN to the recipient;

receiving a telephone call from the recipient from the telephone at the telephone number associated with the recipient;

receiving the PIN over the telephone call; and determining from the PIN received on the telephone call and the Automatic Number Identification (ANI) of the received telephone call whether the recipient is valid.

30. The method of claim 28 further comprising:

determining whether the recipient is associated with a telephone number that has two valid area codes or a telephone number that has changed its area code;

if the telephone number has two valid area codes or has changed its area code, verifying whether the recipient is valid by determining whether the PIN provided by the recipient is valid using the telephone number with each of the two valid area codes or with the previous area code.

31. The method of claim 15 further comprising the steps of:

after receiving the e-mail message, if the telephone number included within the alias e-mail address is associated with an intended recipient whose actual e-mail address cannot be translated form the alias e-mail address, determining whether there is another area code valid for the telephone other than an area code included in the alias e-mail address;

if there is another valid area code, modifying the alias e-mail address of the recipient by using the other area code in place of the area code included in the alias e-mail address to which the e-mail message is addressed and using the modified alias e-mail address to translate into the actual e-mail address associated with the recipient.

32. The method of claim 31 further comprising the step of:

if the modified alias e-mail address cannot be translated to an actual e-mail address, initiating a call to the intended recipient at the telephone number included within the alias e-mail address to which the e-mail message was addressed or within the modified alias e-mail address to provide the intended recipient with the information that an e-mail message has been received.

\* \* \* \* \*